*INVENTOR.*
RICHARD HARRISON HALL

BY Frank A. Steinhilfer

ATTORNEY

United States Patent Office 3,084,061
Patented Apr. 2, 1963

3,084,061
METHOD FOR FORMATION OF ELECTROSTATIC IMAGE
Richard Harrison Hall, Rochester, N.Y., assignor to Xerox Corporation, a corporation of New York
Filed Sept. 23, 1953, Ser. No. 381,890
11 Claims. (Cl. 117—17.5)

This invention relates in general to electrostatic images such as are useful in xerography or electrophotography and, in particular, to the transfer of an electrostatic pattern from a surface having such a pattern to a second surface.

In xerography it is usual to form an electrostatic latent image on a surface, generally by charging a photoconductive insulating surface and dissipating the charge selectively by exposure to a pattern of activating radiation. Whether formed by this means or another, the resulting electrostatic charge pattern is conventionally utilized by the deposition of an electroscopic material thereon through electrostatic attraction, whereby there is formed a visible image or image body of electroscopic particles corresponding to the electrostatic latent image. This image body in turn may be transferred to a second surface to form a xerographic print. In some cases, however, it is desirable to carry out the development, or deposition of image material at a point apart from the photosensitive surface, either on the ultimate print-supporting surface or on some other member.

In accordance with the present invention, an electrostatic latent image is formed by usual methods, optionally including charging and selective charge dissipation, or by other methods of electrostatic latent image formation, and this electrostatic latent image itself is utilized to form an electrostatic image on a second insulating surface whereon it may be developed or otherwise utilized. The invention, therefore, comprises methods for forming a second electrostatic latent image on an insulating surface through the action of a first electrostatic latent image. Thus it is an object of the invention to provide new and improved methods for the formation of an electrostatic latent image on an insulating surface.

It is another object of the invention to provide a new process of xerography wherein an electrostatic latent image on one surface is caused to form an electrostatic latent image on a second surface.

It is an additional object of the invention to provide new methods of xerography wherein an electrostatic latent image from an image bearing surface forms a corresponding latent image on a second surface, which latter image may be developed thereon or otherwise utilized in xerography.

It is an additional object of the invention to provide new methods wherein an electrostatic latent image is formed on a photoconductive insulating surface and the electrostatic latent image is employed to form a corresponding latent image on a non-photoconductive insulating surface.

Additional objects of the invention will in part be obvious and will in part become apparent from the specification and the drawings in which.

For an understanding of the present invention it is to be recognized that the invention contemplates the formation of an electrostatic charge pattern or electrostatic latent image by various means. For example, using the methods of Carlson Patent 2,297,691, an electrostatic latent image can be formed on a photoconductive insulating surface through the steps of charging the surface and selectively dissipating the charge by exposure to a pattern of activating radiation. If desired, other methods of forming the electrostatic latent image may be used such as, for example, selective deposition of an electrostatic charge on an insulating surface to form a pattern of such charge, imposing a potential on a shaped conductor, or the like. The image thus may be formed on a xerographic photosensitive member comprising a photoconductive insulating layer overlying a conductive backing member or on such other combination as may be desired of an insulating surface bearing an electrostatic latent image.

Figure 1:
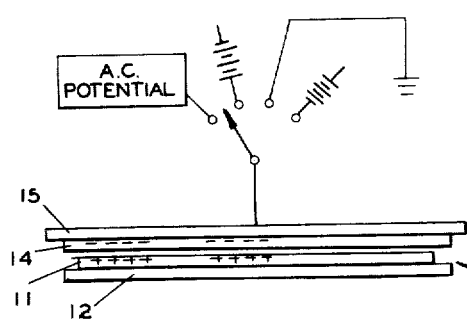
FIGURE 1 is a diagrammatic view of one embodiment of the invention.

According to one embodiment of the invention, as illustrated in FIGURE 1, an electrostatic latent image is supported on an image member generally designated 10 comprising an insulating layer 11 optionally overlying a backing member 12 which generally will be conductive material. This insulating layer 11 may be a photoconductive insulating layer such as, for example, a layer of vitreous selenium, anthracene, sulfur, tellurium, or other photoconductive insulating material including, for example, layers containing particles of photoconductive insulating material in an appropriate binder member. Alternatively layer 11 may comprise an insulating material which need not be photoconductive and may comprise an insulating layer of a suitable non-conductor including, for example, resins, plastics, and other film-forming members.

Disposed adjacent to the insulating, or photoconductive insulating layer 11, is a transfer material such as a transfer web 14 of a suitable insulating member, preferably a self-supporting film member, such as a film of cellophane, cellulose acetate, or other cellulose material or cellulose derivative, or film of a resin such as polystyrene, an acrylic resin, or other vinyl resin, or like resin or plastic material. This transfer member 14, is characterized by being an electrical insulator whereby it can support an electric charge on its surface and whereby an electric charge pattern on its surface may be stored for subsequent utilization. This layer 14 is disposed in contact or virtual contact with the image bearing layer 11 separated only by a very thin air gap. Disposed and positioned behind the transfer member 14 is an electrode 15 which may be supplied with negative, positive, ground, or alternating potential while in contact with all areas of the transfer member 14, and made up of a conductive material such as a conductive metal layer, metallic foil, encased liquid, an insulator such as cotton which has been soaked with a conductive liquid or is in equilibrium with normally humid air or otherwise made at least moderately conductive, conductive rubber, or any other conducting material. If desired, and depending on the material used for electrode 15, a pressure pad may be positioned to cause all areas of member 14 to be contacted by electrode 15.

In operation of the present invention, an electrostatic charge pattern or latent image is formed on the image bearing member 11, as indicated by the plus marks in the drawing, representing a pattern of positive electrostatic charge. The transfer member 14, which may for example be a layer of cellulose acetate or other insulating sheet material, is placed on the image bearing surface in virtual contact therewith across the entire surface. The electrode 15 is then placed behind the transfer member 14 so that all areas of transfer member 14 are contacted by electrode 15 while electrode 15 is maintained at the desired potential. Where electrode 15 is at ground potential or slightly negative potential and a positive electrostatic image is on surface 11, electrons will be attracted to areas on transfer member 14 which correspond to areas of positive charge on surface 11. Where electrode 15 is maintained at a slightly positive potential or is supplied with alternating potential, areas on the transfer surface 14 corresponding to areas on the image surface 11 where positive charges are found will hold negative charge to a greater degree than areas on insulating surface 14 corresponding to areas on image surface 10 where positive charge is not found.

Figure 2:
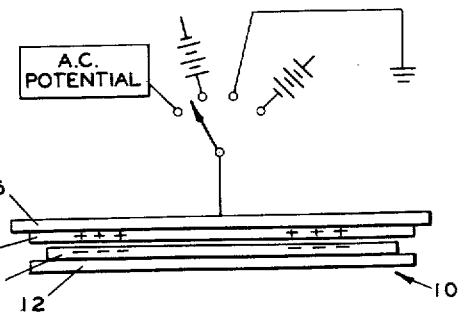
FIGURE 2 is a diagrammatic view of the same embodiment as found in FIGURE 1 where the original latent image is of opposite polarity.

As shown in FIGURE 2, an electrostatic latent image of negative polarity is supported on insulating layer 11 which optionally overlies conductive backing member 12. Where electrode 15 is at ground potential or slightly negative potential or slightly positive potential or is supplied with alternating potential, the areas of insulator 14 corresponding to areas of charge on image surface 11 will be more positively charged than areas of insulator 14 corresponding to areas of no charge on image surface 11.

The image induced on transfer member 14 corresponding to the electrostatic latent image originally supported on insulating layer 11 may be utilized by removal of the conductive member 15, which will fix an induced electrostatic image on transfer member 14. Transfer member 14 may then be removed from the surface area of the image bearing member 11, and developed or otherwise utilized in xerography or like arts.

Figure 3:
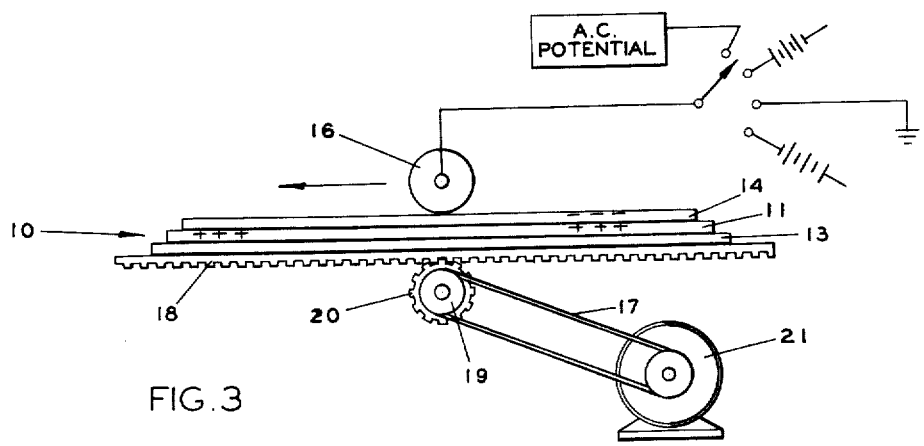
FIGURE 3 is a diagrammatic view of another embodiment of the invention, where a roller member is employed.

In FIGURE 3, another embodiment of the invention is shown wherein roller 16 which may be supplied with negative, positive, ground, or alternating potential is composed of a conductive material such as conductive rubber, or metal or the like, and is positioned and disposed across the width of the image bearing member 10, so that it may be rolled across the length of image bearing member 10, on which transfer member 14 is disposed. This may be accomplished either by moving rolling electrode 16 across the surface of transfer member 14 or by moving image bearing member 10, with the transfer member 14 disposed thereon, beneath and in contact with a stationary roller electrode 16. Thus, for example, a motor 21 operating through belt 17 on pulley 19 drives a rack and pinion assembly comprising a gear wheel 20 operated by pulley 17 engaging a gear-rack 18 mounted on backing member 13. Image bearing member 10 is made up of insulating surface 11 and backing member 13 which in this embodiment is composed of an insulating material such as glass.

Figure 4:
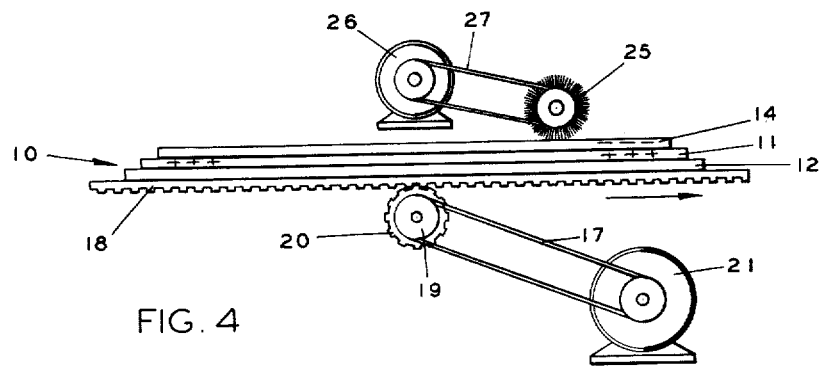
FIGURE 4 is a diagrammatic view of another embodiment of the invention, where a brush member is used.

In FIGURE 4, another embodiment of the invention is shown wherein a brush member 25 is caused to rotate and brush across the entire surface of the transfer member 14. The rotating brush member 25 is driven by motor 26 through belt 27. Image bearing member 10 with transfer member 14 placed thereon is positioned and disposed to move against and along rotating brush member 25 as motor 21, operating through belt 17 on pulley 19 to drive a rack and pinion assembly comprising gear wheel 20 operated by pulley 17 engaging a gear rack 18 mounted on backing member 12, causes image bearing member 10 carrying transfer member 14 thereon to move past the rotating brush member 25. It has been found that the bristles of brush member 25 may be composed of various materials as for example, but in no way limited to, cotton, cotton fibres, nylon bristles, wool, glass fibres, animal fur, steel wool, and the like, the fibres being either insulating or conductive and being either triboelectrically positive or triboelectrically negative with respect to the surface being brushed. The brushing of the transfer member 14 causes deposition of a differentiating charge as between areas on transfer member 14 positioned over image areas and areas on transfer member 14 positioned over non-image areas of surface 11. Transfer member 14 may be developed or otherwise used in xeography or in similar arts when removed out of contact with image bearing member 11.

Figure 5:
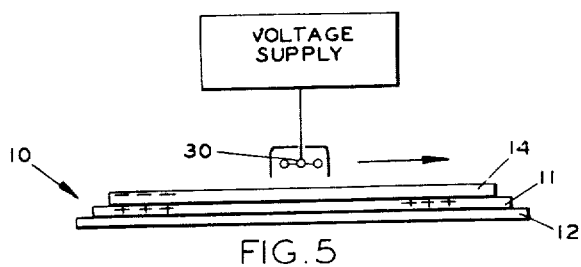
FIGURE 5 is a diagrammatic view of a further embodiment of the invention wherein a corona discharge electrode is a part thereof.

In FIGURE 5, another embodiment of the invention is shown, wherein a non-contacting transfer electrode is employed for formation of the electrostatic image on transfer web 14. Such an electrode may be any of a wide variety of ion sources such as, for example, a radioactive material or other member capable of ionizing air. According to the embodiment shown a corona discharge electrode consisting of high voltage fine wires partly enclosed by a grounded shield, generally designated 30, is positioned adjacent to the path of motion of the assembly comprising image bearing layer 11, conductive backing member 12 and transfer web 14. This corona discharge electrode 30 is optionally connected to a high voltage potential source, either A.C. or D.C., so as to produce corona discharge from the electrode. The high voltage source may, for example, be in the order of several thousand volts, and when high voltage alternating current is utilized, it is desirable to use from 6,000 to 10,000 volts with suitable controls so that the net electric discharge from the electrode 30 will be nearly an equal balance of positive and negative charges. In using a high voltage alternating current source of several thousand volts it has been found desirable to supply suitable controls so that the net electric discharge from electrode 30 which is deposited on transfer member 14 can be made slightly negative, slightly positive or neutral as desired.

The device of FIGURE 5 achieves results comparable with that of the devices shown in FIGURES 1 through 4. Corona discharge electrode 30 passes over the assembly of transfer web 14 on member 10 whereby the substantially neutral, or slightly positive or negative, charge is deposited on the upper or outer surface of transfer web 14. When the image on image surface 11 is composed of positive charges, the point opposite the charged areas on layer 11 of layer 14 will receive a higher negative charge density than the areas opposite the areas of surface 11 carrying no image charge. Where the image areas on surface 11 are negatively charged, the corresponding areas on transfer web 14 will receive a comparably higher positive charge density than the areas on transfer web 14 corresponding to areas of no charge on image bearing surface 11. This, therefore, results in the formation on transfer web 14 of an electrostatic latent image induced by the electrostatic latent image on surface 11.

While it is not intended to limit this invention by an explanation of theoretical mechanisms of operation, it is thought that the following description is sound in its basis and is in conformity with experimental facts. According to present understanding of the invention, the electrode 15 or other member such as roller 16, brush 25 or the like is to be regarded as a source of charge migration to which or from which electrons or ions can migrate under the influence of the field of force associated with an electrostatic image. A source of charge migration, therefore, is brought into the image field and there is controlled and directed by the electrostatic image to form a second charge image. Thus, according to the situation illustrated in FIGURE 1, electrons from this source of charge are drawn to the upper surface of layer 14 by the positive polarity electrostatic image and are retained at the layer by this field of force. In this way the negative charge of the image on layer 14 may be regarded as neutralizing the positive electrostatic latent image on layer 11.

One of the particular advantages which can be achieved according to the present invention is the production of multiple images from an original image formed on a suitable base. Thus, for example, when the invention is applied to xerography, it is possible to form a first electrostatic image by the usual xerography methods, and to produce from this first image an extremely large number of reproduced images. In achieving this result, therefore, it is particularly desirable that the original image on layer 11 should be substantially unaffected by the processing through which its image is cycled.

In order to achieve this particular result it is, therefore, desirable to promote the transfer of charge to the upper or outer surface of layer 14 while preventing or inhibiting the transfer or migration of charge between layers 11 and 14. This result can be attained by various methods such as, for example, appropriate control of potentials or like conditions between the various surfaces. One preferred method of achieving this result, however, follows from preferentially closer contact between electrode 15 and layer 14 than exists between layers 11 and 14. Thus, the distance between layer 15 and layer 14 is controlled to be at an absolute minimum or, alternatively, an increased number of points of molecular contact is achieved by a sliding or moving contact between layer 14 and electrode 15 or by other such means. In FIGURES 1, 2, and 3, the result can be achieved by sliding contact between these two members, while in FIGURE 4 such increased contact results necessarily from the operation of the apparatus. Similarly, in the case of a remote electrode as disclosed in FIGURES 5 and 6, the actual source of charge migration will be the ions formed in air by such an electrode and thus will be present virtually against surface of layer 14 and may be considered to be in the most intimate possible contact therewith.

It is interesting and valuable to note that the presence of an induced image on layer 14 is independent of the net average charge or potential on the layer. For example, the source of charge migration may supply ground or neutral potential or it may supply either net positive or net negative charge. This, in any case, is not material to the invention provided such negative or positive potential is not increased to the level of field emission or like secondary effects. If, for example, the average potential on layer 14 is negative, the image area represented by the minus signs in FIGURE 2 will be correspondingly more negative and the non-image areas correspondingly less negative. In such a case, the negative image can be experimentally measured and has been found experimentally to be capable of development by the usual xerographic methods. Conversely, if the average or net potential on layer 14 is positive, then the non-image areas will be more positive and the image areas will be either negative or comparatively less positive. In either case the induced image can be developed or otherwise utilized as a negative polarity electrostatic image.

Similarly, the situation in FIGURE 2, namely an original negative polarity image, gives rise to the formation of a usable positive polarity image and this is true regardless of average or net polarity on the entire member.

It is thought that these facts serve to explain certain aspects of the operation of the invention. It is now believed that in each of the embodiments of the invention there is a source of charge migration which permits the upper surface of layer 14 to achieve a substantially uniform potential over its entire surface. The charge pattern on layer 14 is brought about by the attracting or repelling force of the original image on layer 11 and is reflected on layer 14 by the charge density in image areas as compared to non-image areas while a uniform potential is maintained on layer 14. Thus, the source of charge migration supplies electric charge at ground, positive, or negative potential while the original image directs this charge into a pattern or image configuration.

In reference to each of the figures it is seen that this explanation conforms with the facts. In FIGURES 1 and 2, a conductive electrode makes very close contact with layer 14, thus conducting charge to or from this layer. In FIGURE 3, an analogous result is achieved with a rolling electrode. Likewise, in FIGURES 4, 5, and 6, a source of charge migration makes charge available at the surface of layer 14 while the closely positioned electrostatic image attracts or repels charge into an image configuration. This is true in all cases regardless of net positive or negative potentials on the layer, but it is to be realized that a nearly neutral potential may be desirable in order to avoid or minimize secondary effects such as field emission which may occur between closely spaced surfaces at moderately high potentials or other secondary effects which may be associated with higher potentials or potential gradients.

The embodiments described or their explanations are in no way intended to limit the scope of this invention. As an example of other possible embodiments particles may be rolled or cascaded over the surface of the transfer member which is in contact with an image bearing member. As in the embodiment of the invention using a rotating brush member the materials cascaded over the surface may be any material. It is also possible to choose beads coated with a material having such a triboelectric relation to the transfer member as to cause electrostatic charge to be deposited on the transfer member as the beads cascade over the transfer member. Another possibility is to place a charge on particles and cascade them over the surface of the transfer member with sufficient force to prevent the particles from adhering to the transfer member due to the electrostatic field created by the charged image areas on the image bearing member while the charges on the particles will be deposited on the transfer member to create an induced electrostatic image thereon. The charge can be positive or negative as in the embodiments described and an image will be produced.

From the explanations given it should be clear that charges deposited on transfer member 14 appear on the surface out of contact with surface 11. Charges on surface 11 need not be in any way effected by the steps necessary to induce an electrostatic latent image on transfer member 14, and hence the original latent image that exists on surface 11 before steps are taken to induce this image onto another member exists without any deterioration after an image has been induced onto another member. This factor allows for subsequent use of the original electrostatic latent image so that an infinite number of induced images for use in xerography may be produced.

It has been found that either side of transfer member 14 may be used to produce a usable image, i.e., either side may be developed or otherwise used in xerography or similar arts. The images will be of the same negative or positive nature, that is, where a negative photographic type of image is produced on one side a negative photographic type image will be produced on the other side and where a positively formed photographic image will be produced on one side, a positively formed image will be produced on the other side. It is presently understood that the image formed on the one side is the reproduction directly caused by the charge pattern on that side while the image on the reverse side is the electrostatic field pattern extending through the sheet from the charges existing on the opposite surface. A distinction in the images produced is that one will be the mirror image of the other.

It has also been found that in any of the operations described, the same end result may be accomplished by laying more than one transfer member on image bearing member 10. In such a case, after electrode 15 or its equivalent in other embodiments is passed over the surface of the transfer members the top transfer member will have a developable image thereon. This same process may be repeated for each transfer member placed on image bearing member 10, and in each case the top member will have a developable image thereon. A developable image may also be obtained where transfer member 14 is not in contact with image bearing member 10, but is separated from surface 11 by a slight air gap or other dielectric.

It is also pointed out that once a latent electrostatic image is placed onto a transfer member, the transfer member itself may be used as the master for further transfers.

Figure 6:
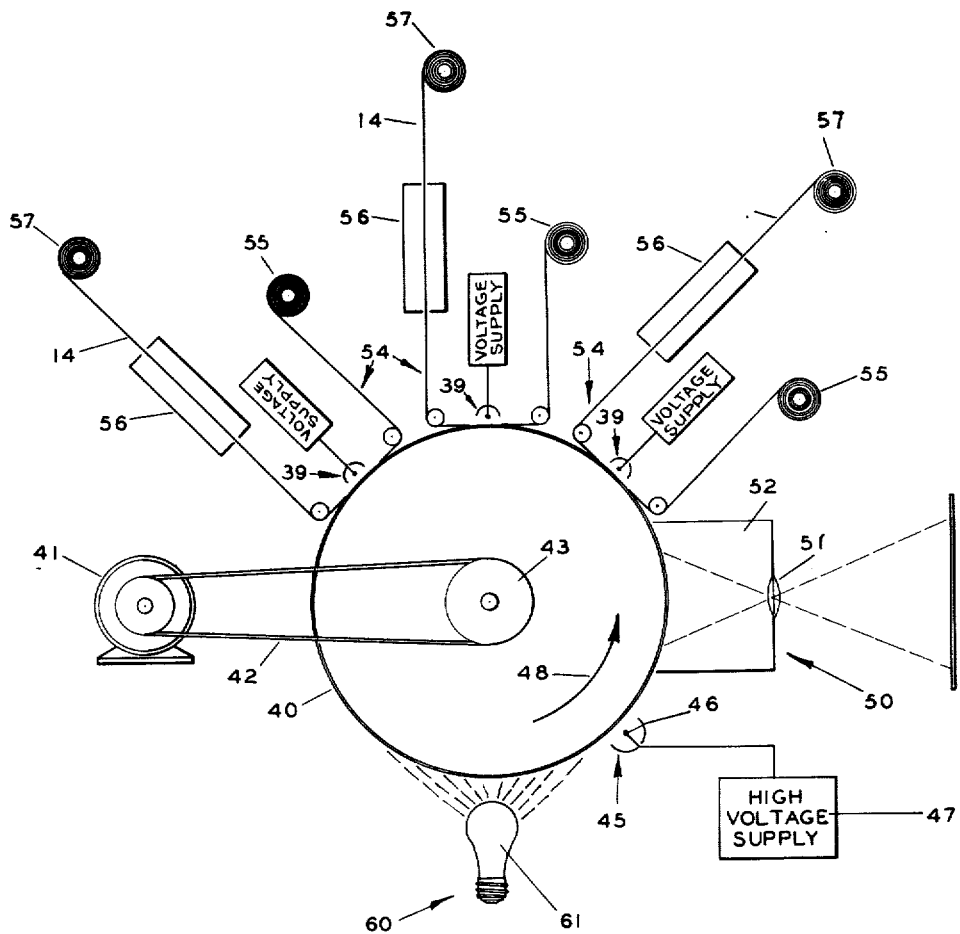
FIGURE 6 is a diagrammatic view of an automatic machine according to another embodiment of the invention.

In FIGURE 6, a diagrammatic view is shown of a xerographic copying machine which operates with a cylindrical or rotary xerographic photosensitive member 40, generally comprising a photoconductive insulating layer overlying a conductive backing member as in accordance with previous figures. As desired, this photosensitive member may be in the form of a support cylinder, having a photoconductive insulating layer coated thereon, or may comprise a suitable support member having separably mounted xerographic photosensitive members supported thereon to surround at least a portion and preferably all of the cylindrical surface. As shown in FIGURE 6 the photosensitive member is mounted externally on the cylinder, however it may be mounted internally and the other mechanisms may be adapted for operation within the cylinder rather than as shown. A suitable drive means is provided such as, for example, a motor 41 adapted to drive the cylinder through a belt 42 operated on the pulley 43.

At a charging station, generally designated 45, is positioned a suitable charging device such as, for example, a corona charging electrode 46 operably connected to a high voltage potential source which desirably may be a source adapted to supply a potential in the order of about 7,000 volts positive polarity to the charging electrode. Alternatively, other charging means may be provided, such as for example, a frictional charging brush contact charging member or the like. Desirably, a photosensitive surface on leaving the charging station will be charged to an operating potential such as for example, a positive polarity potential in the order of up to several hundred volts.

Next adjacent in the order of rotation of the cylinder as indicated by arrow 48 is an exposure station generally designated 50 where the photosensitive surface is exposed to a suitable image which it is desired to reproduce. This image may be in any suitable form generally comprising a pattern of light and a shadow of visible or other activating radiation directed onto the surface of the photosensitive member. For example, a lens 51 in a camera housing 52 may be positioned to focus on the surface of the photosensitive member a continuous image which it is desired to reproduce in one or more copies.

From charging station 45 and exposure station 50 there result on the surface of the photosensitive member an electrostatic image which may be formed by deposition of an electrostatic charge on the photosensitive surface and selective dissipation of this charge to leave residing on the plate a charge pattern. The photosensitive surface then passes to one or more transfer stations, generally designated 54, wherein there is formed on a transfer web 14 an electrostatic latent image corresponding to the electrostatic latent image borne on the photoconductive surface 40. At each transfer station is positioned a transferring member 39, which may suitably be a conductive plate or roller, a rotating brush member, a corona discharge electrode, or such other member or mechanism as may be within the scope of the invention as herein set forth. In FIGURE 6 transferring member 39 is shown as a corona discharge element. A transfer web 14 feeds from a transfer web source 55 passing between transferring member 39 and the photosensitive surface 40, thence through a development zone 56 to a take up roll 57 wherein the web may be stored for further use. Between transferring member 39 and the sensitive surface 40 an image is formed on the transfer web 14 as in the case shown in the prior embodiments. The image then may be developed by passing through the development zones 56 wherein electroscopic material is deposited on the transfer web in conformity with the electrostatic latent image on the web, which image in turn has been placed thereon by the action and effect of the electrostatic latent image on the photosensitive surface.

After passing through one or more such transfer stations, the photosensitive surface 40 optionally may be carried through a discharging station generally designated 60, where a lamp 61 or other light source is directed onto the photosensitive surface discharging substantially the entire charge on the photosensitive surface. The surface, then optionally in its neutral condition, is recycled through the stages and operations herein described.

At the development station 56 shown in FIGURE 6, electroscopic material may be deposited on the transfer web by any of numerous development methods. For example, there may be used development methods shown in Carlson Patent 2,221,776 or in Carlson 2,297,691, and Carlson Patent 2,357,809. One presently preferred method of development of this image is by cascading across the surface of the transfer web a two-component developer according to the method described in Wise Patent 2,618,552. It is to be understood, however, that additional or other methods of developing may be employed without departing from the scope of the present invention, such as, for example, the method of Carlson U.S. 2,624,652.

In a further specific embodiment of the invention there is provided an improved method for the formation of a developed electrostatic latent image wherein the deposited electroscopic material formed on the electrostatic image conforms in an improved manner with the electrical image. In xerography in general it is to be recalled that it is usual to form an electrostatic latent image on a photoconductive insulating layer overlying a conductive backing member. It is observed that the photosensitive member of zerography in many ways in analogous to the electrical structure of a condenser. One plate of this simulated condenser is the conductive backing or support member and the other plate is the charged surface of the photoconductive insulating layer. These two plates or surfaces are separated from each other by a dielectric which is, in this case, the photoconductive insulating layer. The electrostatic field from the charged insulating layer generally exists between the insulating member and the conductive backing member, and a relatively small proportion of this field of force extends outwardly into the space adjacent to the charged layer. This results in a condition whereby there is a greater tendency for development in areas of gradation of potential than in areas of high uniform potential. Transferred into practical effect this means that xerographic reproductions tend to have excessive contrast and tend not to give full density in relatively large uniform black areas unless specific steps are taken to counteract this result.

In prior efforts to improve the photographic quality of the developed xerographic image, attempts have been made to carry out development while a counter electrode or development electrode is placed closely adjacent to the photoconductive insulating layer in such position that this development electrode simulates a third condenser plate, whereby the internal condenser effect of the usual xerographic plate is alleviated. As improvement in developing may be accomplished by virtue of the methods in apparatus described in this invention in producing an electrostatic induced latent image on a transfer member made up of insulating material in the absence of a conductive backing member. Thus, in developing the induced electrostatic image the insulating material is removed from other members which could cause the electrostatic lines of force to be internal, and during developing the capacitance to ground is substantially absent. The electrostatic image on transfer member 14 is therefore substantially free from distortion of an adjacent electrode and when developed yields a xerographic print more closely corresponding to the original image to be reproduced.

It is, therefore, a result of the present invention that an improved xerographic or electrophotographic developed image is formed by a method comprising inducing a second latent image on a transfer member in contact or slightly out of contact with a first electrostatic image on an insulating surface and positioned between such surface and a transferring member, followed subsequently by removing the transfer member from the first insulating image bearing surface or area and developing the induced electrostatic image substantially removed from effects of adjacent conductive members.

While the present invention as to its object and advantages, has been described herein as carried out in specific embodiments thereof, it is not desired to be limited thereby but it is intended to cover the invention broadly within the spirit and scope of the attended claims.

What is claimed is:

1. The method of reproducing an invisible electrostatic charge pattern on an insulating layer conforming to an invisible electrostatic charge pattern on an image bearing surface comprising positioning a thin sheetlike insulating layer within the area of influence of the electrostatic field of an electrostatic image on an image bearing surface with a first surface of said insulating layer facing toward said image bearing surface, and applying a source of charge migration to all areas of the opposite and second surface of said insulating layer to bring said second surface to a substantially uniform electric potential whereby a persistent pattern, conforming in configuration to the invisible charge pattern on the image bearing surface, of actual and real electrostatic charges is formed on the insulating layer, said electric potential applied to said second surface of said insulating layer being maintained at a level to avoid secondary discharge effects between said image bearing surface and said insulating layer.

2. The method of claim 1 in which said source of charge migration comprises ions from a corona discharge source.

3. The method of claim 1 in which said source of charge migration comprises a conductive layer connected to a potential source.

4. The method of reproducing an invisible charge pattern on an insulating layer conforming to an invisible electrostatic charge pattern on an image bearing surface comprising positioning a first surface of a thin sheetlike insulating layer in face-to-face contact and across an image bearing surface carrying an invisible electrostatic charge pattern, applying a source of charge migration to all areas of the opposite and second surface of said insulating layer to bring said second surface to a substantially uniform electric potential in which the charge density varies in accordance with the image on the image bearing surface, and removing said electrostatic image on said image bearing surface away from said insulating layer whereby a persistent pattern, conforming in configuration to the invisible charge pattern on the image bearing surface, of actual and real electrostatic charges is formed on said insulating layer, said electric potential applied to said second surface of said insulating layer being maintained at a level to avoid secondary discharge effects between said image bearing surface and said insulating layer.

5. The method of claim 4 in which the electric potential applied is substantially at ground potential.

6. The method of claim 4 in which the electric potential applied comprises a net positive potential.

7. The method of claim 4 in which the electric potential applied comprises a net negative potential.

8. The method of reproducing a visible developed image on an insulating layer conforming in configuration to an invisible electrostatic charge pattern on an image bearing surface comprising positioning a first surface of a thin sheetlike insulating layer in face-to-face contact and across an image bearing surface carrying an invisible electrostatic charge pattern, applying a source of charge migration to all areas of the opposite and second surface of said insulating layer to bring said second surface to a substantially uniform electric potential in which the charge density thereon varies in accordance with the image on the image bearing surface whereby a persistent pattern of actual and real electrostatic charges is formed on the insulating layer, removing said electrostatic image on said image bearing surface away from said insulating layer, said electric potential applied to said second surface of said insulating layer being maintained at a level to avoid secondary discharge effects between said image bearing surface and said insulating layer, and developing with visible developer particles the varying charge densities on said insulating layer thereby to form a visible image on the insulating layer conforming in configuration to said invisible electrostatic charge pattern on said image bearing surface.

9. The method of producing a plurality of invisible charge patterns each on an insulating layer each conforming in configuration to an invisible electrostatic charge pattern on an image bearing surface comprising positioning a plurality of thin sheetlike insulating layers in contact with one another and in contact and across an image bearing surface carrying an invisible electrostatic charge pattern, said plurality of layers all being within the area of influence of the electric field of force of said electrostatic charge pattern on said image bearing surface, applying a source of charge migration to all areas of the outer surface of the insulating layer farthest from said image bearing surface to bring said outer surface to a substantially uniform electric potential in which the charge density thereon varies in accordance with the image on the image bearing surface, said outer surface of said farthest insulating layer being out of contact with the adjacent insulating layer of said plurality of said insulating layers and out of contact with said image bearing surface, removing the farthest insulating layer of said plurality of insulating layers out of the field of influence of said image on said image bearing surface whereby a persistent pattern of actual and real electrostatic charges is formed on said farthest insulating layer, said electric potential applied to said outer surface being maintained at a level to avoid secondary discharge effects, and then through at least one more cycle applying a source of charge migration to the new outer surface of the new insulating layer farthest from said image bearing surface to bring the new outer surface to a substantially uniform electric potential in which the charge density thereon varies in accordance with the image on the image bearing surface and removing the new farthest insulating layer out of the field of influence of said electrostatic charge pattern on said image bearing surface whereby a persistent pattern of actual and real electrostatic charges is formed on said new farthest insulating layer, said electric potential applied to said new outer surface being maintained at a level to avoid secondary discharge effects.

10. The method of image formation in which a light insensitive electrostatic image is formed and developed on an insulating layer having a first surface in contact with an electrostatic image bearing surface comprising bringing all areas of the opposite and second surface of said insulating layer to a substantially uniform electric potential in which the charge density varies in accordance with the image on the image bearing surface whereby a persistent pattern, conforming in configuration to the image on the image bearing surface, of actual and real electrostatic charges is formed on the insulating layer, said electric potential applied to said second surface of said insulating layer being maintained at a level to avoid secondary discharge effects between said image bearing surface and said insulating layer, removing the electric field of the electrostatic image on the image bearing surface from said insulating layer, and developing the pattern on the insulating layer by depositing developer material thereon.

11. The method of image formation of claim 10 in which the image bearing surface comprises a photoconductive insulating layer and in which the field of the image from the image bearing surface is removed from the insulating layer through exposure of said photoconductive insulating layer to uniform light.

References Cited in the file of this patent

UNITED STATES PATENTS

| | | |
|---|---|---|
| 2,200,741 | Gray | May 14, 1940 |
| 2,233,037 | Smith | Feb. 25, 1941 |
| 2,297,398 | Fries | Sept. 29, 1942 |
| 2,297,691 | Carlson | Oct. 6, 1942 |
| 2,357,809 | Carlson | Sept. 12, 1944 |
| 2,576,047 | Schaffert | Nov. 20, 1951 |
| 2,693,416 | Butterfield | Nov. 2, 1954 |
| 2,922,883 | Giaimo | Jan. 26, 1960 |

FOREIGN PATENTS

| | | |
|---|---|---|
| 188,030 | Great Britain | Oct. 23, 1922 |

OTHER REFERENCES

"Text-Book of Physics," Poynting and Thomson; Electricity and Magnetism; Parts I and II; Static Electricity and Magnetism; Second Edition; Charles Griffen and Co. Ltd., Exeter St., Strand, W.C. 2, London; 1920; pages 14, 15 and 16.

McMaster: "New Developments in Xeroradiography," Non-Destructive Testing, vol. 10, No. 1, Summer 1951, pp. 8–25; pp. 10, 11, 17, 18 and 23 particularly relied upon.

Disclaimer 3,084,061.—*Richard Harrison Hall*, Rochester, N.Y. METHOD FOR FORMATION OF ELECTROSTATIC IMAGE. Patent dated Apr. 2, 1963. Disclaimer filed Aug. 20, 1970, by the assignee, *Xerox Corporation*.
Hereby enters this disclaimer to claim 11 of said patent.
[*Official Gazette December 8, 1970.*]